C. A. DOUGLAS. Improvement in Milk Coolers.
No. 123,813. Patented Feb. 20, 1872.

Witnesses:
A. Bennerkendorf
Geo. W. Mabee

Inventor:
C. A. Douglas
per
Attorneys.

UNITED STATES PATENT OFFICE.

CHARLES A. DOUGLAS, OF FRANKLIN, NEW YORK.

IMPROVEMENT IN MILK-COOLERS.

Specification forming part of Letters Patent No. 123,813, dated February 20, 1872.

Specification describing a new and Improved Milk-Cooler, invented by CHARLES A. DOUGLAS, of Franklin, in the county of Delaware and State of New York.

My invention consists of milk-troughs within water-troughs in gangs or series, preferably one above another, with water and milk-discharge pipes and adjustable apparatus for regulating the height of the water surrounding the milk-troughs, all as hereinafter described.

Figure 1:
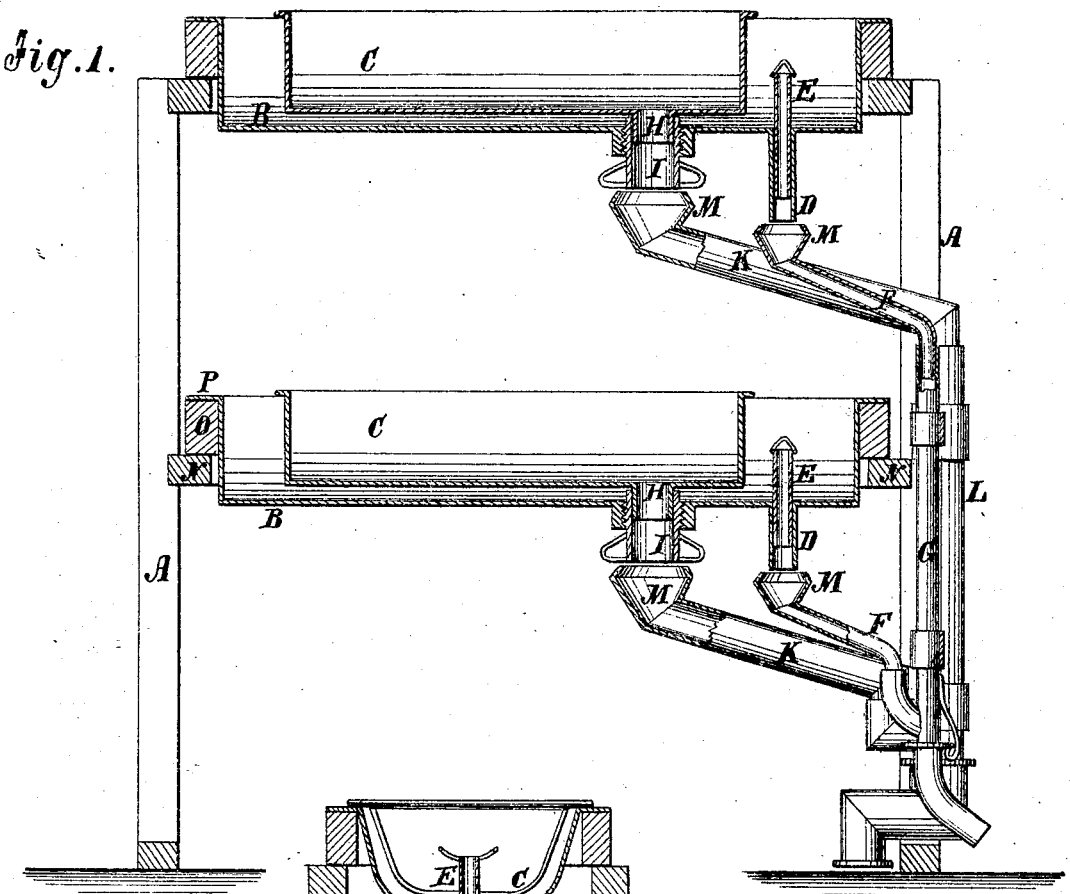
Figure 2:
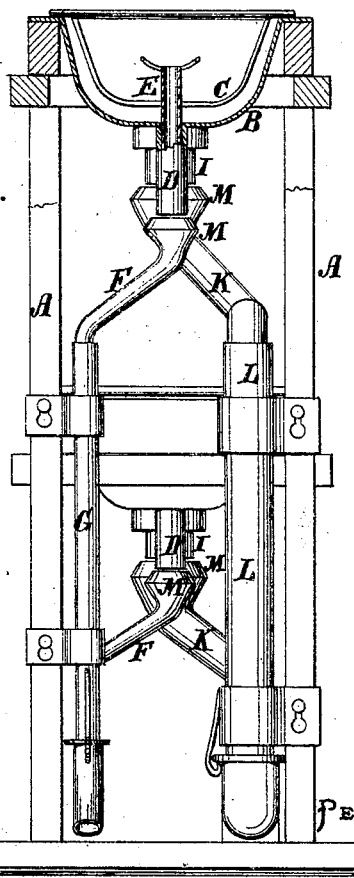

Figure 1 is a longitudinal sectional elevation of my improved cooling apparatus; and Fig. 2 is a transverse section of the same.

Similar letters of reference indicate corresponding parts.

A represents a high, narrow, and long frame adapted to support a series of water-troughs, B, one above another, as shown. C represents a milk-trough in each water-trough supported above the latter to allow the water to surround the lower part. D is a discharging-nozzle for each water-pipe, with a short vertically adjustable tube, E, tightly fitting the nozzle, and extending above the bottom, so that the water that escapes must pass through it from the upper end, and being adjusted higher or lower will vary the height of the water accordingly. F represents branch water-escape pipes leading into a main pipe, G, which conveys the water away. H represents the discharge-nozzles of the milk-troughs extending down into bushings, I, screwed up through the bottoms of the water-troughs water-tight and fitting the nozzles so as to prevent leakage around them. K represents the branch milk-pipes, and L the main pipe for conducting the milk away when the plugs used in the nozzles H are withdrawn. Both the water and milk branch-pipes are provided with funnels, M, at the upper ends, to insure the receiving of the water while allowing the nozzles to be removed and reapplied frequently as the troughs must be frequently taken down to be cleaned, for which they are supported above the beams N by the bars O and flanges P of the water-troughs.

This is a simple and efficient cooling apparatus for holding milk to obtain the cream.

Having thus described my invention, I claim as new and desire to secure by Letters Patent—

A series of water-troughs, B, and milk-troughs, C, with discharging-nozzles D and H, branch and main discharge-pipes F G and K L, bushings S I, and water-regulators E, all combined and arranged substantially as specified.

CHARLES A. DOUGLAS.

Witnesses:
S. L. SLADE,
GEO. STILSON.